United States Patent [19]

Lee

[11] Patent Number: 5,706,142
[45] Date of Patent: Jan. 6, 1998

[54] METHOD OF MOUNTING LENSES IN ILLUMINATED SIGNS, ETC.

[76] Inventor: Chung N. Lee, 6812 S. Western Ave., Los Angeles, Calif. 90047

[21] Appl. No.: 570,355

[22] Filed: Dec. 11, 1995

[51] Int. Cl.⁶ ............................................. G02B 7/02
[52] U.S. Cl. ...................... 359/819; 359/811; 359/619; 40/454
[58] Field of Search .............................. 359/811, 819, 359/800, 802, 809, 619, 621, 626; 40/454

[56] References Cited

U.S. PATENT DOCUMENTS

| | | |
|---|---|---|
| 2,252,504 | 8/1941 | Hahn . |
| 4,669,832 | 6/1987 | Wolken ........................... 359/619 |
| 4,696,546 | 9/1987 | Hodges ........................... 359/802 |
| 4,732,453 | 3/1988 | de Montebello et al. ........ 359/619 |
| 5,146,703 | 9/1992 | Boden ............................. 40/454 |

*Primary Examiner*—Loha Ben
*Attorney, Agent, or Firm*—Erik M. Arnhem

[57] ABSTRACT

Transparent acrylic lens elements can be screwed into drilled holes in the display sheet of an interiorly lighted sign box, to form illuminated messages. Each lens element has an enlarged head, and a cylindrical shank fitting into one of the drilled holes. A helical wall extending around and along the shank, so that the lens element can be rotated for screwing the element into the drilled hole. The helical wall has parallel flat side surfaces adapted to exert frictional grip forces on the associated display sheet, so that the lens element can be inserted partway into the hole to achieve different spacings of the enlarged head relative to the display.

1 Claim, 2 Drawing Sheets

METHOD OF MOUNTING LENSES IN ILLUMINATED SIGNS, ETC.

FIELD OF THE INVENTION

The present invention relates to illuminated signs and the like. One object of the invention is to provide an improved method of mounting lenses formed of transparent acrylic material (with and without colors injected) in holes in the faces of signs or the like to form letters, characters and/or designs; whereby the lenses may be readily mounted without requiring the use of clips, springs, or other extraneous fasteners to hold same in place in their respective holes in the signs, said lenses being retained therein merely by specially constructed helical grooves on the lens body.

BACKGROUND OF THE INVENTION

Most commonly used display signs are illuminated signs having lighting devices on the outside illuminating the sign faces. In some signs the lighting device is located inside the sign container with the sign face made of glass or plastic with letters, words and/or designs.

U.S. Pat. No. 2,252,504 patented on Aug. 12, 1941 to Bernard Hahn discloses methods of mounting lenses in illuminated signs, etc. Hahn discloses in the patent two methods of permanently mounting lenses into the holes on the sign faces.

A first method involves the following steps: (1) forming resinous material into a heat stable blank of desired lens shape which is overall larger than the holes of the sign faces; (2) then reshaping a portion of the lens to fit into the holes by using compression and heat treatment to change the heat stable lens into heat unstable lens; (3) and then "freezing" the heat unstable lens to retain its form; and (4) inserting the frozen lens into the hole and by applying heat. The heat unstable lens will resume its heat stable form and while changing over from heat unstable into heat stable condition, expand to lock itself in the hole in the sign permanently.

A second method involves the same steps as (1) and (2), and then instead of chilling or "freezing" step, the lens is inserted into the hole while it is still hot. This step will allow the compressed and heat treated lens to cool and revert back to its original form before the compression and heat treatment, expanding and locking itself in the hole permanently.

The present invention achieves the same purpose as Hahn, and further improves the method. Most important aspect of the present invention is that the lenses are not permanently mounted to allow changeability of lenses as desired.

SUMMARY OF THE INVENTION

The present invention provides transparent, colored, or uncolored acrylic elongated lenses having dome shaped heads. A shank portion of each lens body has a helical wall that forms a screw. These screw lenses are rotated into holes on the display sheet of the sign, forming letters, characters, and/or designs. The display sheet is made of light impermeable materials. Once the face sheet with holes is placed over the lighting device, the light cannot shine except through the acrylic lenses. As the illumination shines through the clear acrylic lenses, the color injected lenses shine brightly with particular colors designated displaying a rainbow of colors.

BRIEF DESCRIPTION OF THE DRAWINGS

The present invention will be explained with references to the accompanying drawings which illustrate several practical embodiments thereof.

In said drawings:

FIG. 5 is a series of drawings showing a process of mounting the helical groove lens into the hole securely:

DETAIL DESCRIPTION OF THE PREFERRED EMBODIMENT

Figure 1:
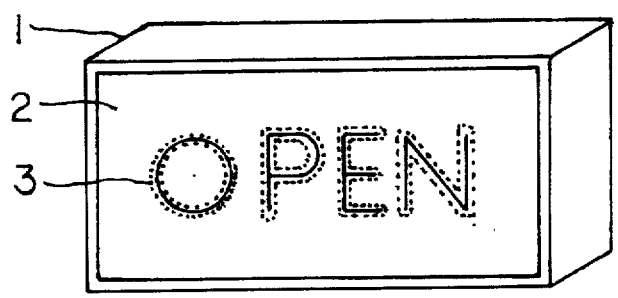
FIG. 1 is a perspective view of a rectangular sign with letters outlined by holes on the display sheet.
Figure 8:
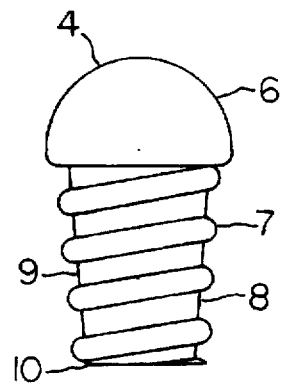
FIG. 8 is an enlarged view of the lens body depicted in FIGS. 5 through 7.
Figure 6:
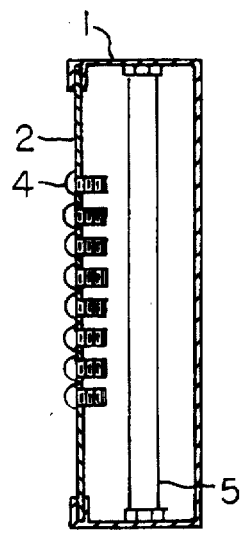
FIG. 6 is a side cut-out sectional view showing the rectangular sign of FIG. 1 cut out at the side depicting a sign box, lighting device, display sheet, and lenses completely mounted on one side.
Figure 7:
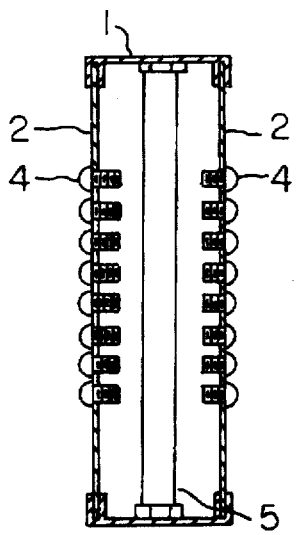
FIG. 7 is same view as FIG. 6 except there are two display sheets on both sides with fully mounted lenses.

In FIGS. 1, 6 and 7 the reference numeral 1 indicates a conventional rectangular sign with a display sheet 2 having holes 3 outlining letters, characters, and/or design on the display sheet 2, usually by painting. Each hole is adapted to receive a lens constructed as shown in FIG. 8. The lenses are inserted into holes 3 to form lettering on the sign. In FIGS. 6 and 7 the numeral 5 indicates a fluorescent lamp used to illuminate the sign from the interior in the usual manner, the same emitting light rays which pass directly through the lenses 4; however an incandescent lamp has have been found very effective for illumination of signs containing lenses 4, and still other methods of illumination may be used.

Figure 2:
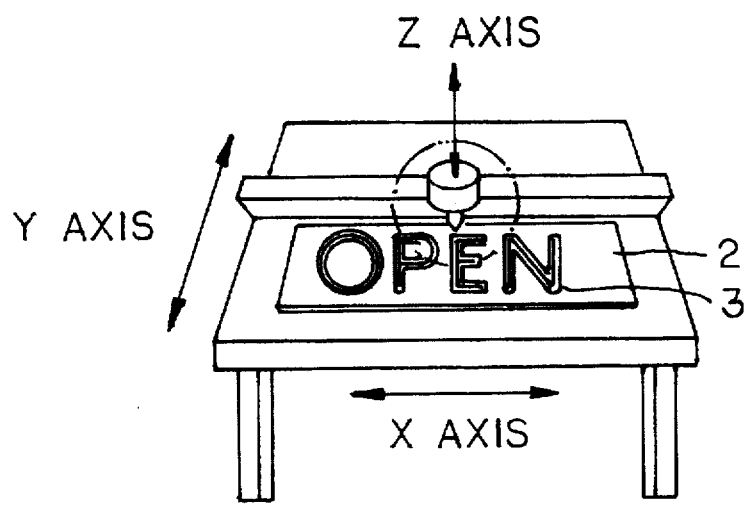
FIG. 2 is a top perspective view of an apparatus for drilling holes on the display sheet forming letters.
Figure 3:
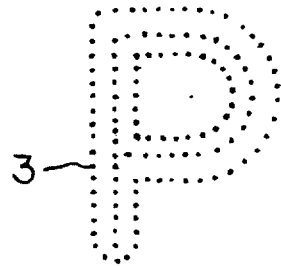
FIG. 3 is an enlarged drawing of a letter showing numerous holes outlining a character.
Figure 4:
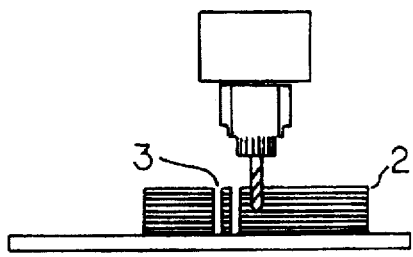
FIG. 4 is an enlarged and detailed side cut-out view of encircled portion in FIG. 2, showing multiple sheets being drilled together.
Figure 5A:
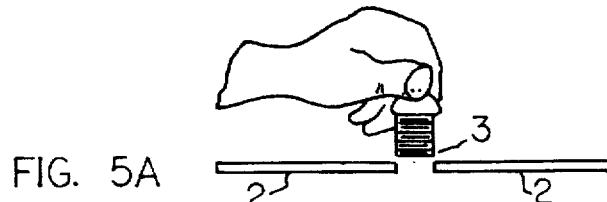
FIG. 5A depicts a lens with helical groove prior to being inserted into the hole on the display sheet.
Figure 5B:
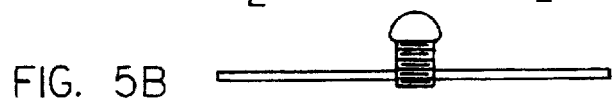
FIG. 5B depicts the lens at initial insertion into the hole.
Figure 5C:
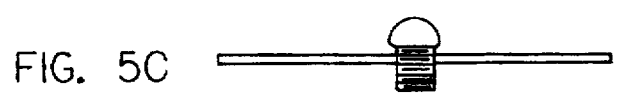
FIG. 5C depicts the spiraled groove lens inserted half way into the hole of the display sheet.
Figure 5D:
FIG. 5D depicts the lens completely inserted into the hole.

FIG. 2 illustrates a method of drilling holes 3 on the display sheet 2 using a drilling machine. FIG. 3 shows an enlarged drawing of a typical letter formed by making holes 3 outlining particular letters, characters, and/or designs. FIG. 4 is an enlargement of a encircled portion of FIG. 2. FIG. 4 shows a side close up view of a drilling machine making holes 3 on the display sheets 2 stacked together.

FIG. 8 is an enlarged view of the lens body. As shown, the lens body has a domed head 6 which is larger than the diameter of hole 3 in display sheet 2. Head 6 functions as a stopper during the process of inserting lens 4 into hole 3. The lens body includes an elongated cylindrical shank 9 having essentially the same diameter as hole 3. The cylindrical shank can be tapered slightly, as shown in FIG. 8, to facilitate insertion into hole 3. On the cylindrical shank there is a helical wall 7 going from the end of the shank to domed head 6. Helical wall 7 has two parallel flat side surfaces and an interconnecting edge surface 12. The helical wall forms a helical groove 8 that has an axial thickness dimension marginally smaller than the thickness dimension of display sheet 2, whereby the lens can be inserted into hole 3 by a turning screw-like motion. Helical groove 8 has a mouth opening 10 to facilitate initial insertion of shank 9 into hole 3.

Once inserted, lens 4 can be rotated to deepen its insertion into and through hole 3. The axial thickness dimension of helical groove 8 allows the lens body to turn while enabling the side surfaces on helical wall 7 to maintain a firm grip on display sheet 2.

FIG. 5 illustrates a method of mounting a lens 4 made of clear acrylic material having domed topped head 6 and helically grooved shank as described in FIG. 8 into the hole 3 of the display sheet 2: FIG. 5A illustrates the first step in mounting the lens 4 into the hole 3. The opening 10 of the lens 4 is placed directly above the hole 3 on the display sheet 2. Then the opening 10 allows the lens 4 to slide into the hole 3 on the face sheet 2. Once inserted, rotation of the lens 4 will further insert the lens 4 into the hole 3 as depicted in FIGS. 5B and 5C. The method of mounting using rotation allows the lens 4 to be securely mounted since the width of the helical groove 8 is only slightly smaller than the thickness of the face sheet 2 to allow wall 7 to firmly grip the display sheet 2 thereby preventing looseness without permanently mounting the lens body. Further, this method allows the lenses 4 to be at different heights to provide different visual effects. FIG. 5D shows the lens 4 inserted completely into the hole 3.

FIGS. 6 and 7 show side cut-out views of the rectangular sign 1 with a fluorescent lamp lighting device 5 inside having one display sheet 2 and two sided display sheets 2, respectively.

The present method of attaching or mounting illuminating sign lenses, made of transparent acrylic materials, in clear and various colors, to form designs, letters, numerals, and/or characters by this process is an improvement of an existing method. The plastic lens blanks can have various different dimensions and/or diameters and/or shapes.

I claim:

1. In a lighted message display sign that includes a hollow light enclosure having at least one display sheet, said sheet having a series of holes arranged in a pattern representing a message to be displayed, a light source in said enclosure, and a transparent plastic light-conducting lens body mounted in each hole so that light rays are transmitted from the light source through each lens body; the improvement comprising:

each lens body comprising an elongated cylindrical shank insertable in an associated hole in the display sheet; an enlarged head carried by said shank for disposition outside the light enclosure, and a helical wall extending around and along said shank; said helical wall having two generally parallel flat side surfaces and an interconnecting edge surface; said helical wall having a thickness dimension defined by the spacing between said flat side surfaces; said helical wall forming a helical groove extending around and along said shank; the thickness dimension of said helical wall being greater than the thickness dimension of said helical groove; said shank having a diameter enabling the shank to extend through the associated hole in the display sheet; the thickness dimension of the helical groove being marginally smaller than the thickness dimension of the display sheet, whereby the lens body can be rotated to advance the shank into the hole while the flat side surfaces of the helical wall exert frictional grip forces on the display sheet, such that the enlarged head can have a range of different spacings relative to the display sheet.

* * * * *